May 22, 1962 R. A. DEIBEL 3,035,296
WINDSHIELD CLEANER
Filed Oct. 18, 1954 2 Sheets-Sheet 1
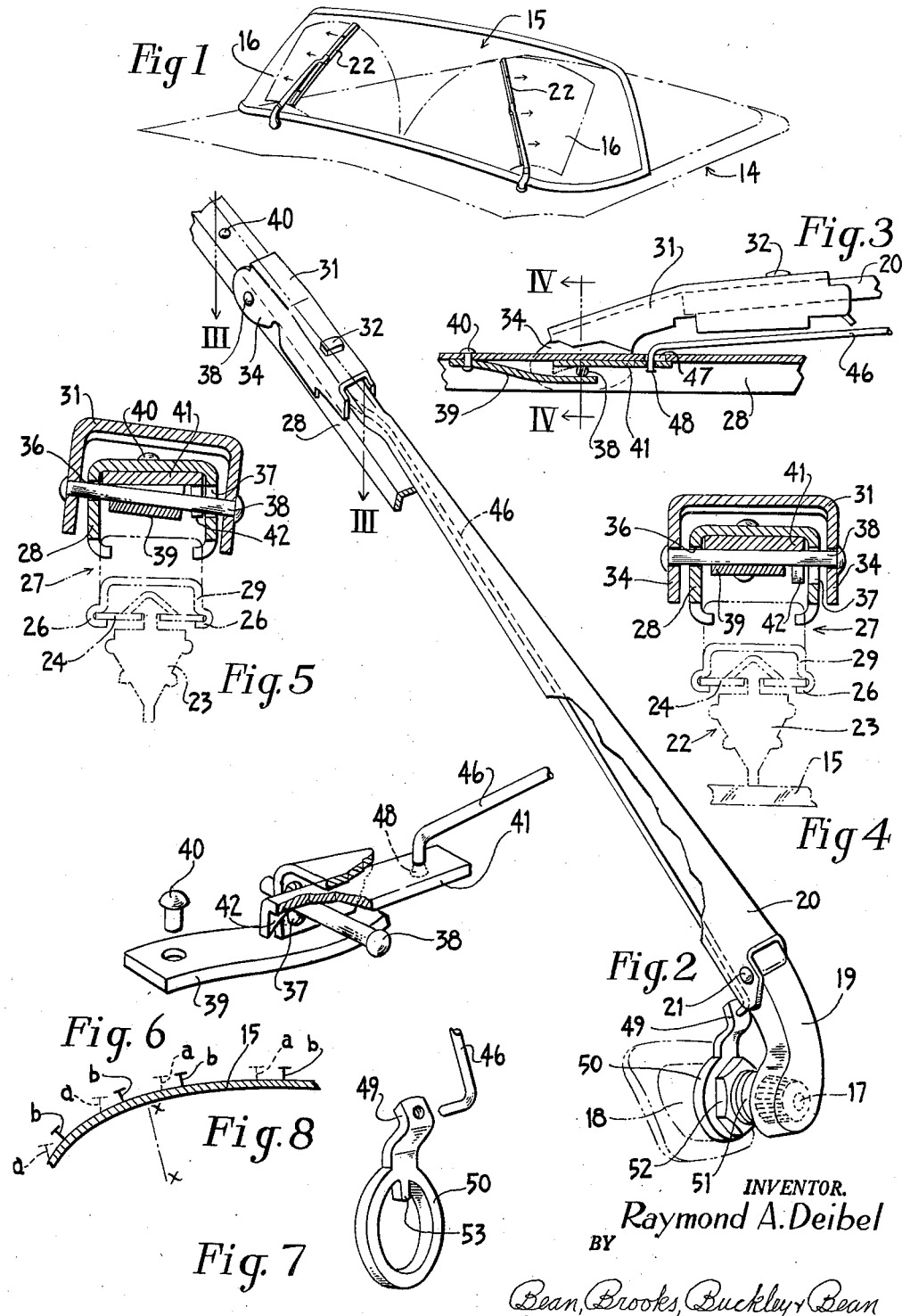
INVENTOR.
Raymond A. Deibel
BY
Bean, Brooks, Buckley & Bean
ATTORNEYS May 22, 1962 R. A. DEIBEL 3,035,296
WINDSHIELD CLEANER
Filed Oct. 18, 1954 2 Sheets-Sheet 2
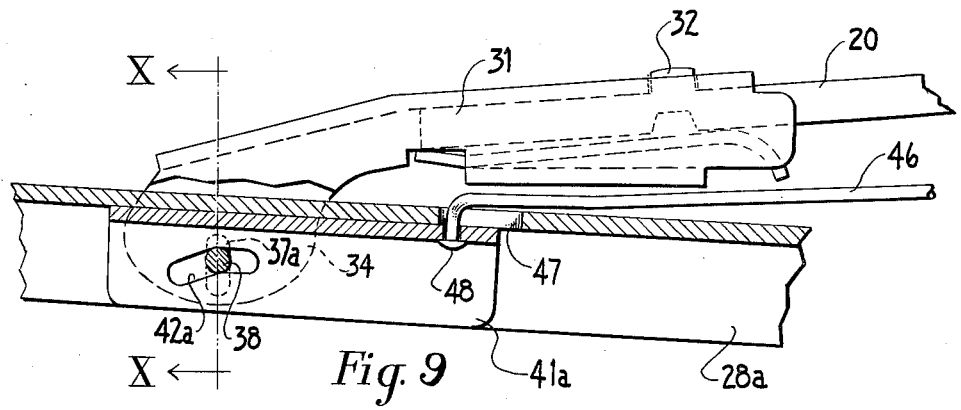
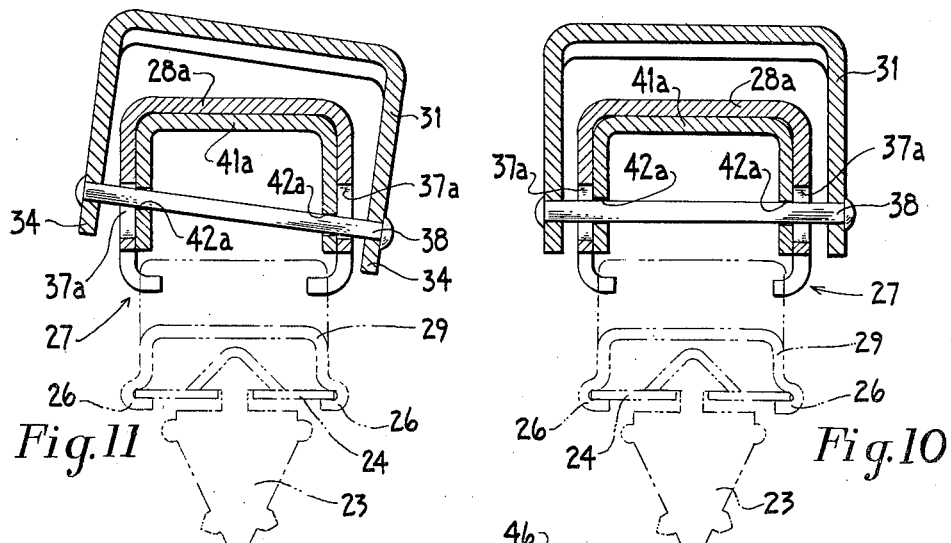
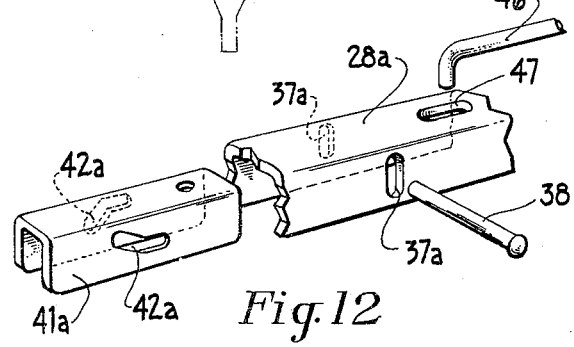
INVENTOR.
Raymond A. Deibel
BY
Bean, Brooks, Buckley + Bean
ATTORNEYS United States Patent Office 3,035,296
Patented May 22, 1962

3,035,296
WINDSHIELD CLEANER
Raymond A. Deibel, Cheektowaga, N.Y., assignor to Trico Products Corporation, Buffalo, N.Y.
Filed Oct. 18, 1954, Ser. No. 462,737
7 Claims. (Cl. 15—250.23)

This invention relates to the windshield cleaning art and more particularly to windshield cleaners for curved windshields.

The curved windshields currently in general use on automotive vehicles have irregularly curved surfaces with the curvature being considerably more pronounced at the sides of the windshield than at its central front section which, although curved, is usually relatively flat. A current type of "wrap-around" or "panoramic" windshield has a very sharp change in curvature at its sides as compared to its central front portion, so that the windshield wiper blade must sweep around a corner to wipe the windshield sides.

Windshield cleaners heretofore used for such curved windshields generally comprise a squeegee or blade made of rubber or other like plastic flexible material and having a relatively thin wiping edge engaging the windshield. The wiping edge extends from an enlarged body portion that is usually somewhat loosely supported in a flexible metal backing strip so that the blade is substantially normal to the strip, and the backing strip is usually held in a flexible pressure distributing wiper frame or holder by a plurality of spaced claws engaging the sides of the backing strip. The holder or frame is suitably secured to a wiper arm mounted on a wiper rock shaft that oscillates about a single fixed axis. This windshield wiper arrangement is such that the attitude of the wiper parts changes with relation to the windshield surface as the wiper moves from the front part of the windshield to its sides. Accordingly, when the wiper is at the front part of the windshield at the beginning of its outward stroke, the wiper blade or squeegee is substantially normal to the windshield surface and its backing strip is substantially parallel to the adjacent portion of the windshield surface. When, however, the wiper is at the side of the windshield beginning its inward stroke, the wiper blade is at a small acute angle with respect to the windshield surface and the backing strip is almost normal to it so that one edge of the strip and the strip-engaging claws of the holder frame are spaced only a small distance from the windshield surface. When the windshield surface is only partially wet, or is sticky for some other reason, the wiper element of the blade tends to cling abnormally to the glass surface, producing a drag on the wiper element that causes metal wiper parts like the holder frame and backing strip to contact the glass surface. This mars and scratches the windshield, especially at its sides, frequently necessitating replacement of the windshield. Moreover, parts of the wiper arrangement sometimes become misshapen in handling and assembly, or in replacement of worn wiper blades, to such extent that metal parts of the wiper contact and mar the sides of a wrap-around windshield even when it is not abnormally sticky. Wrap-around and like curved windshields currently in use on automobiles are very expensive to replace, and it is therefore important to eliminate the possibility that the windshield cleaner will scratch or mar the windshield.

Another problem with wrap-around and like curved windshield is chatter. When the wiper blade is displaced from an attitude normal to the windshield surface beyond certain limits so that the acute angle of inclination between the blade and the windshield surface during wiping operation in one direction is too small, the wiper blade when moved in the opposite direction will chatter across the windshield and visibility is impaired. Windshield cleaners for curved wrap-around windshields have heretofore been constructed so that the blade assumes a proper wiping position in the relatively flat portion at the front of the windshield, and then necessarily assumes a small acute angle relative to the windshield surface at its side corners at the beginning of the inward stroke. This sometimes results in the aforementioned chattering action, particularly when the windshield is only partially wet or is sticky.

The present invention contemplates a novel windshield cleaner arrangement for wrap-around and like curved windshields, which incorporates a novel arrangement for controlling the attitude of the windshield wiper relative to the windshield surface during wiper operation to eliminate the aforementioned difficulties.

It is therefore a principal object of the present invention to provide a windshield cleaner for curved windshields wherein the blade normalizing action is located in proximity to the wiper blade to more accurately control its position, with respect to the windshield surface, for a more effective wiping.

It is a related object of this invention to provide for wrap-around and like irregularly curved windshields having sharp changes in curvature a windshield cleaner in which the outwardly disposed normalizing action is actuated and controlled from a fixed point of anchorage adjacent the center of wiper oscillation whereby the wiper normalizing mechanism is definitely timed to function repeatedly in accordance with the contour pattern of the windshield surface.

It is still another object of the present invention to provide a windshield cleaner for curved windshields that uses a simple and economical construction by which the mounting of the wiper on the outer end of its actuating arm incorporates an arrangement for rocking the wiping blade about a longitudinal axis to hold its position normal to the curved windshield surface during wiping operation.

It is another object of this invention to provide for wrap-around and like irregularly curved windshields having sharp changes in curvature a relatively simple, efficient windshield cleaner in which the attitude of the wiper blade and holder frame relative to the windshield is varied through a wiper adjusting member that moves relative to an actuating arm lengthwise of the latter to effect a rocking of the wiper about an axis which parallels its longitudinal axis.

It is still a further object of the present invention to provide an adjusting windshield cleaner for wrap-around and like curved windshields which is of practical design and economical construction.

The foregoing and other objects will manifest themselves as this description progresses, reference being made therein to the accompanying drawings, wherein:

FIGURE 1 is a perspective view depicting part of a vehicle having a panoramic or wrap-around windshield and embodying the windshield cleaner of the present invention.

FIGURE 2 is a fragmentary perspective view of the wiper carrying arm and part of the wiper superstructure, with portions of the arm broken away;

FIGURE 3 is a fragmentary side elevation of the wiper arm and wiper superstructure showing in section part of the wiper position control means according to one embodiment of the present invention;

FIGURE 4 is a section view taken along lines IV—IV in FIGURE 3 when the wiper is at the relatively flat portion of the windshield;

FIGURE 5 is a sectional view similar to FIGURE 4 illustrating the displacement of the wiper holder frame and blade when the wiper is at the curved side or corner of the windshield to adjust the attitude of the wiper relative to the windshield surface;

FIGURE 6 is an exploded fragmentary perspective view showing part of the wiper position control means in the embodiment of FIGURE 3;

FIGURE 7 is an exploded fragmentary perspective view of another part of the wiper position control means in the embodiment of FIGURE 3;

FIGURE 8 is a diagrammatic sketch of a wrap-around windshield and wiper illustrating and comparing the attitude of the wiper blade and holder frame with respect to the windshield at various wiper positions for windshield cleaners constructed according to the present invention and according to the prior art;

FIGURE 9 is a fragmentary side elevation view similar to FIGURE 3 showing a modified form of wiper position control means;

FIGURE 10 is a sectional view taken along line X—X of FIGURE 9 when the wiper is at the relatively flat portion of the windshield;

FIGURE 11 is a sectional view similar to FIGURE 10 illustrating the displacement of the wiper holder frame and blade when the wiper is at the curved side or corner of the windshield;

FIGURE 12 is an exploded fragmentary view of the wiper position control means in the modification of FIGURE 9.

Referring to the drawings, the numeral 14 designates a motor vehicle with a wrap-around windshield 15 having a pronounced curvature at its sides forming corners 16. Referring particularly to FIGURE 8, there is seen a diagrammatic plan view sketch of part of windshield 15 illustrating the attitude of the windshield wiper relative to the windshield surface in various positions during wiper operation. The small T-shaped figures $a$ and $b$ represent a wiper according to the prior art and the present invention, respectively, with the stem of the T indicating the wiper blade and the cross bar of the T representing the wiper blade backing strip and wiper holder frame. In windshield wipers heretofore in use, the wiper holder frame and backing strip stay substantially normal to the wiper drive shaft axis $x$—$x$ during wiper oscillation so that the attitude of the wiper blade and holder relative to the windshield changes as the wiper moves across the windshield surface in a manner diagrammatically illustrated by the various positions of T-shaped wipers $a$ in FIGURE 8. It will be noted that when the prior art wiper $a$ is at the corner 16 of wrap-around windshield 15, the blade is at a small acute angle thereto and the wiper holder frame and backing strip are almost in contact with the windshield surface. Thus drag on the wiper blade on the inward stroke of the wiper sometimes causes the metallic parts of the wiper backing strip and holder frame to contact the windshield and mar or scratch it, particularly when the windshield is only partly wet or is sticky. This relationship between the blade and windshield surface also may cause the wiper to chatter outwardly across the windshield thereby impairing the driver's vision.

According to the present invention there is provided a novel means which controls the attitude of the wiper blade and maintains the wiper backing strip and holder frame substantially parallel to the windshield throughout the wiper stroke. This is illustrated by the T-shaped wipers $b$ in FIGURE 8. In this way, the present invention prevents marring or scratching of the windshield surface by metal parts of the wiper and also eliminates the aforementioned chattering action making the wiper operate more efficiently.

Referring now to FIGURES 2–7, a rock shaft 17 is journalled at the lower side of windshield 15 in a suitable bearing 18 on vehicle 14 and carries a wiper arm having a fixed mounting section 19 and an outer blade carrying section 20 hinged to the mounting section 19 by a pivot 21. The end of arm section 20 supports a wiper 22 of well-known construction comprising a rubber blade or squeegee body 23 supported in a flexible metal backing strip 24 with the outer side margins of the strip being slidably held by a plurality of spaced claws 26 of a metallic pressure distributing, surface conforming superstructure or holder frame generally indicated at 27. The wiper superstructure or holder frame 27 is usually composed of a plurality of pivotally connected yokes or levers and, as shown, it includes a primary yoke 28 and one or more channel-shaped secondary yokes or levers 29 having the aforementioned strip-engaging claws 26 by which the wiper blade backing strip 24 and the blade 23 are retained in frame 27.

According to the present invention, the wiper frame 27 is pivotally supported on the outer end of wiper arm 19, 20 and a position control means is provided to rock the wiper relative to the wiper arm to change the attitude of superstructure 27 and blade 23 relative to the wiper arm in a manner maintaining the attitude thereof relative to the windshield surface 15 substantially constant as the wiper oscillates back and forth across it. This normalizing action is interposed between the wiper and the outer end of the wiper arm, the latter being provided with a channel-shaped arm fitting 31 detachably retained on the arm by a lug 32 of suitable construction, and fitting 31 is provided with a pair of ears 34 straddling the channel-shaped primary yoke 28 of the wiper superstructure 27. One side wall of the primary yoke 28 is provided with a small circular opening 36 while the opposite wall is provided with a slot 37 extending transversely toward the wiper blade 23. Both openings 36 and 37 receive a cross pin 38 that is of lesser diameter than opening 36 and is carried by the yoke-straddling ears 34 on arm fitting 31. The provision of enlarged opening 36 and elongated slot 37 enables the wiper frame 27 and blade 23 to rock laterally between the ears 34 of fitting 31 as indicated in FIGURE 5 when the wiper is displaced relative to the wiper arm during wiping operation by means presently described. A leaf spring 39 is secured at one end to the web of the primary yoke 28 as by a rivet 40 and the other end of the spring bears against the underside of cross pin 38 to yieldably urge the uppermost part of slot 37 against pin 38 so that the wiper and blade are normally in the position shown in FIGURE 4.

To rotate wiper frame 27 and blade 23 relative to the wiper arm, a position control member 41 is slidably mounted within the channel of the primary yoke 28 between the web thereof and cross pin 38, and is provided with a cam portion 42 adjacent the slot 37 adapted to press down against the adjacent end of cross pin 38 against the upward urge of spring 39. Suitable actuating means is provided to automatically slide the position control member 41 so that cam portion 42 presses against pin 38 and thereby tilts wiper frame 27 and blade 23 relative to the wiper arm and fitting 31 thereon, as illustrated in FIGURE 5, when the wiper arm sweeps around the sharply curved side portion 16 of the windshield 15. As illustrated, such actuating means comprises a drag link 46 extending within the channel of the wiper arm, having one end passing through elongated slot 47 in the web of primary yoke 28 and secured to the position control member 41 at 48. Drag link 46 is pivotally anchored at its other end in a suitable fixed lug 49 off-center from the wiper rock shaft 17. Preferably, the anchor lug 49 is formed on an annular collar 50 that is suitably non-rotatably clamped in position upon a threaded extension 51 on the shaft bearing 18 by a retaining nut 52, or like means. A key 53 is provided on the collar 50 to fit into a keyway (not shown) on the outside of shaft bearing 18 to locate the anchor lug 49 off-set with respect to rock shaft 17 so that when the wiper arm oscillates, the eccentricity of lug 49 imparts a push or pull relative to the drag link 46 to longitudinally displace control member 41. This engages or disengages cam 42 with respect to the cross pin 38 to govern the attitude of the wiper frame 27 and blade 23 relative to the windshield surface 15 according to its curvature. It will be apparent that anchor lug 49 could be mounted on the vehicle frame rather than on the bearing 18 as shown but the described arrangement is compact, simple and efficient and is therefore preferable.

This arrangement provides a normalizing wiper action that is interposed between the wiper and the arm and is located adjacent the wiper so that its operation will be applied directly to the wiping element for a more positive control over its attitude during the wiping strokes. This normalizing mechanism also serves to connect the wiper to the arm.

The operation of the device is as follows: When the drive shaft 17 is oscillated by the drive means for the windshield cleaner, the wiper arm rocks back and forth across windshield 15 with wiper 22. Referring to the windshield wiper in FIGURE 1 to the right of the motorist, and to FIGURES 4 and 5, when the wiper is on the front part of windshield 15, pin 38 engages the flat section of control slide member 41 as shown in FIGURES 3 and 4, and the wiper is in "normal" position shown in FIGURE 4, with the web of the channel-shaped primary yoke 28 substantially parallel to the cross pin 38. When, however, the wiper is at the corner 16 of windshield 15, the eccentricity of anchor lug 49 is such that it provides a drag on line 46 which slides the wiper arm and control member relative to each other, causing the cam section 42 thereon to press against the pin 38 and rock the wiper, including frame 27 and blade 23, counterclockwise in FIGURE 5 so that, as the wiper passes over the curved side 16 of windshield 15, the wiper superstructure members 28 and 29 are rotated to position the claws 26 and backing strip 24 substantially parallel to the windshield surface to maintain the wiper blade 23 substantially normal thereto. This avoids contact between the windshield 15 and the metal parts 24, 26, 28 and 29 of the wiper as it sweeps around the corner of the windshield, thus preventing such parts from marring or scratching the windshield, and it further eliminates chatter of the wiper across the windshield.

FIGURES 9–12 show a modified embodiment of the present invention which is generally similar to that shown in FIGURES 2–7, and for clarity like parts are identified with like numerals as in FIGURES 2–7.

In this modification, opposed vertical slots 37a are provided in the side walls of primary yoke 28a of the wiper, and the position control member 41a is channel-shaped and is provided with oppositey inclined cam slots 42a. Position control member 41a is slidably received in the channel of primary yoke 28a and the cross pin 38 is supported in the ears 34 of arm fitting member 3 extending through adjacent slots 37a and 42a. The modification of FIGURES 9–12 is otherwise the same as the embodiment of FIGURES 2–7 and includes a drag link 46 extending through slot 47 and connected to slide member 41a at 48 and to an anchor lug like 49 to move member 41a back and forth relative to the wiper arm 20 as the latter oscillates over the side 16 of the windshield 15. When slide member 41a is thus, in effect, reciprocated by the drag link 46, the oppositely inclined cam slots 42a in control member 41a coact with the vertical slots 37a in the primary yoke 28a to jointly act upon the cross pin 38 thereby rocking the wiper frame 27 and blade 23 counter-clockwise in FIGURE 11 within the arm fitting 31. This controls the attitude of the wiper relative to the windshield as it sweeps around the corner thereof in like manner as in the above-described embodiment of FIGURES 2–7 preventing contact between the metal wiper parts and the windshield at the corner 16 thereof, and normalizing the blade 23 with respect to the windshield surface to eliminate chattering.

In both forms of the invention, the primary yoke carries the wiping blade 22 to its laterally adjusted position. The normalizing adjustment of the wiper is effected by means of a blade rocking part that has a movement lengthwise of the wiper arm which movement is translated into a component for laterally rocking the wiping blade.

It will be apparent from the foregoing that the present invention provides a windshield cleaner for wrap-around and like curved windshields that includes a practical, effective and economical means for controlling the attitude of the wiper holder and blade relative to the windshield during wiper operation whereby the blade is maintained substantially normal to the windshield during the wiper stroke and contact between the metal parts of the wiper and the windshield is prevented. In this way the windshield cleaner of this invention prevents metal parts of the wiper from scratching or marring the windshield and, also eliminates chattering of the wiper across the windshield surface.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A windshield cleaner for a wrap-around or like curved windshield on a vehicle, comprising an oscillatory drive shaft, a wiper arm mounted on said drive shaft so that it oscillates therewith, a fitting on said wiper arm, a wiper comprising a holder frame and wiper blade, with said frame rockably supported on said fitting, cam means supported on said fitting operatively associated with said wiper frame for tilting the wiper relative to said fitting and wiper arm, means operatively connected to said cam means and said vehicle for actuating said cam means when said wiper arm oscillates over the windshield to adjust the attitude of the holder frame and wiper blade relative to said windshield surface.

2. A windshield cleaner for a wrap-around or like curved windshield on a vehicle, comprising an oscillatory drive shaft, a wiper arm supported on said drive shaft to oscillate therewith, a channel-shaped arm fitting supported on said wiper arm, a carrying member supported by said fitting, a wiper holder frame tiltably mounted on said member, a wiper blade held in said holder frame, cam means in operative engagement with said holder frame and said carrying member for tilting said frame and blade relative to said carrying member and wiper arm upon movement of the cam means with respect to said carrying member, actuating means operatively connected to said bearing and cam means to tilt said wiper frame and blade relative to the windshield surface to substantially normalize the blade with respect thereto.

3. A windshield cleaner for a wrap-around or like curved windshield on a vehicle, comprising an oscillatory drive shaft, a wiper arm supported on said drive shaft to oscillate therewith, a channel-shaped fitting supported on said wiper arm, a cross member supported in said fitting, a wiper holder frame rockably mounted on said cross member within the channel of said fitting, a wiper blade held in said holder frame, cam means in operative engagement with said holder frame and cross member for rocking said frame and blade relative to said cross member and wiper arm upon movement of the cam means relative to the cross member, a drag link having an end connected to said cam for moving it relative to said cross member, an anchor lug for the other end of said drag link operatively connected thereto, said anchor lug being positioned eccentrically to said drive shaft axis so that oscillation of said wiper arm alternately imposes a push and pull on said cam means moving it to rock said wiper frame and blade relative to said windshield surface to maintain the blade substantially normal with respect to said surface.

4. A windshield cleaner for wrap-around and like curved windshields as defined in claim 3, wherein said anchor lug extends from a ring having a detachable interlocked connection with a bearing for the shaft.

5. A windshield cleaner for a wrap-around vehicle windshield having sharp changes in curvature at the sides thereof, comprising an oscillatory drive shaft, a wiper arm supported on said drive shaft to oscillate therewith, a pivotal support dependent from said arm, a surface-conforming wiper comprising a holder frame including an elongated generally channel-shaped primary member having a web and two sides extending therefrom, said primary member being rockably mounted on said pivotal support, a wiper blade supported by said holder frame, cam means movably interposed between said pivotal support and said primary member for rocking said wiper frame and blade relative to said arm upon movement of the cam means relative to said arm, actuating means operatively connected to said cam means for positioning the latter to rock said wiper frame and blade relative to said windshield surface to hold the blade substantially normal thereto.

6. A windshield cleaner for a wrap-around vehicle windshield having sharp changes in curvature at the side thereof, comprising an oscillatory drive shaft, a wiper arm supported on said drive shaft to oscillate therewith, a channel-shaped fitting supported on the end of said wiper arm, a cross member supported on said arm fitting, a surface-conforming wiper holder frame including an elongated generally channel-shaped primary member having a web and two sides extending therefrom provided with opposed openings therein, said primary member being rockably mounted on said cross member in said channel-shaped fitting with the cross member extending through said openings, a wiper blade supported by said holder frame, cam means comprising a plate slidably interposed between said primary member and cross member with a cam section depending therefrom engaging the cross member to rock said wiper relative to said fitting upon longitudinal displacement of said cam section, actuating means operatively connected to said vehicle and cam means for displacing the latter to rock said wiper frame and blade relative to said windshield surface to hold the blade substantially normal thereto.

7. In a windshield cleaner adapted for use on a curved window surface, wiper supporting means including a flexible backing, a wiper actuating arm having at its outer end means adapted for connection to said wiper supporting means, and a wiper normalizing construction mounting said wiper supporting means on said arm end means comprising, a pair of longitudinally extending and laterally offset cam parts carried by one of said means and a cooperating bearing surface therefor carried by the other of said means, said cam parts riding on said bearing surface to controllably rock said wiper supporting means laterally for adjusting said wiper supporting means to maintain the flexible backing thereof substantially parallel to a curved window surface being traversed by said arm whereby to maintain the supported wiper substantially normal to such surface.

References Cited in the file of this patent

UNITED STATES PATENTS

| | | |
|---|---|---|
| 2,079,399 | Drew et al. | May 4, 1937 |
| 2,356,424 | Paton | Aug. 22, 1944 |
| 2,412,319 | Carey | Dec. 10, 1946 |
| 2,533,963 | Sacchini | Dec. 12, 1950 |
| 2,691,186 | Oishei et al. | Oct. 12, 1954 |
| 2,809,388 | Wise | Oct. 15, 1957 |